W. A. HOMAN.
ROTARY ENGINE.
APPLICATION FILED JAN. 28, 1918.
1,349,882.
Patented Aug. 17, 1920.
8 SHEETS—SHEET 2.
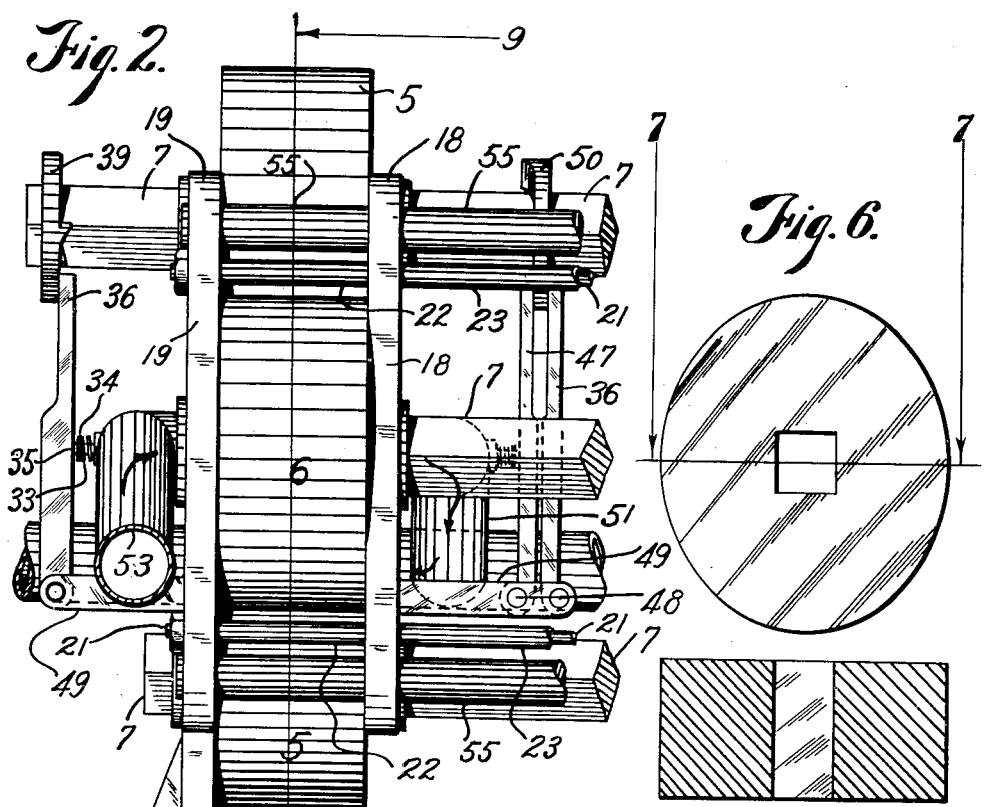
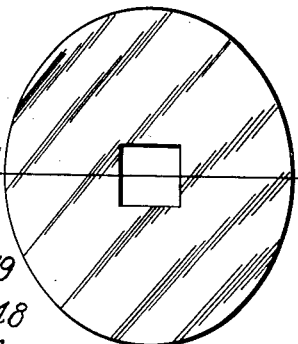
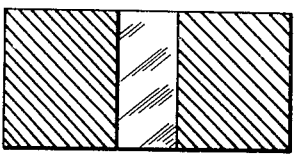
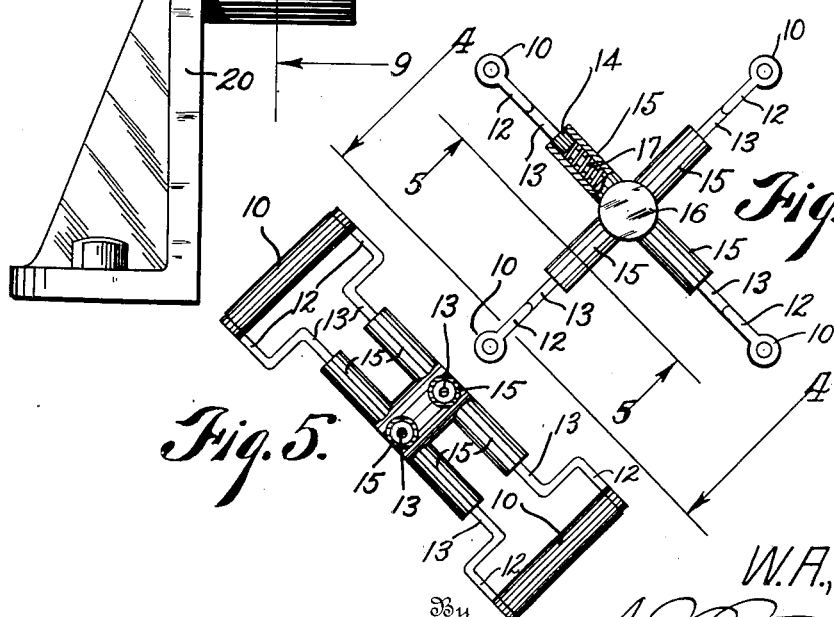
Inventor
W.A., HOMAN
By
Attorney

W. A. HOMAN.
ROTARY ENGINE.
APPLICATION FILED JAN. 28, 1918.

1,349,882.

Patented Aug. 17, 1920.
8 SHEETS—SHEET 6.

Inventor
W. A. HOMAN.
By
Attorney

W. A. HOMAN.
ROTARY ENGINE.
APPLICATION FILED JAN. 28, 1918.

1,349,882.

Patented Aug. 17, 1920.
8 SHEETS—SHEET 7.

Inventor
W. A. HOMAN.
By
Attorney

UNITED STATES PATENT OFFICE.

WALTER A. HOMAN, OF DENVER, COLORADO.

ROTARY ENGINE.

1,349,882.  Specification of Letters Patent.  Patented Aug. 17, 1920.

Application filed January 28, 1918. Serial No. 214,074.

*To all whom it may concern:*

Be it known that I, WALTER A. HOMAN, a citizen of the United States, residing at the city and county of Denver and State of Colorado, have invented certain new and useful Improvements in Rotary Engines; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in rotary engines, my object being to provide a construction in which the pistons of the engine continue their movement in the desired given direction as distinguished from engines in which the pistons reciprocate. My object is to provide a construction of this character which shall be simple, efficient and economical, both as regards original cost and cost of operation and maintenance.

In my improved construction I employ a sufficient number of elliptically-shaped pistons which are mounted to inclose a chamber which varies in volume during the rotation of the pistons, whereby a charge of explosive mixture which is drawn into this chamber by virtue of the expansion of the volume is subsequently compressed and exploded, after which the chamber is scavenged of the products of combustion by virtue of the reduction in volume. Hence, if it be assumed that the gas is compressed and exploded, the action of the explosive force on the elliptical pistons causes them to move in such a manner that the volume of the chamber is expanded during a quarter of the revolution of the pistons, during which time the explosive force has acted for piston driving and power purposes, after which the exhaust port is opened and as the volume of the chamber is reduced during another quarter turn of the pistons, the burned gases are expelled, after which the exhaust port is closed and the intake port opened, whereby a charge of gas is drawn into the chamber during the next quarter revolution of the pistons; while during the next quarter rotation of the pistons this charge of gas is compressed and ready for explosion, after which the cycle just explained is repeated. It will thus be observed that during each complete rotation of the several pistons, the functions of exploding the gas for piston operating and power purposes, the scavenging of the chamber; the drawing of a charge of explosive mixture into the chamber; and the compression of said charge, are all accomplished.

In order to prevent actual contact of the rotary pistons during the operation of the engine and still maintain the chamber between the pistons in the proper condition for the performance of the aforesaid function, provision is made for sealing the chamber, which as illustrated in the drawing is accomplished through the medium of anti-frictional rollers, each of which engages two pistons in the sealing relation during the operation of the engine. Any suitable arrangement of the anti-frictional rollers may be employed, also any other suitable or practicable sealing means may be used.

In order that the rotary action of all the pistons shall be unitary for power producing and transmission purposes, the shafts of the several pistons are equipped with gears which are so connected that the power of the pistons is cumulated for the aforesaid purpose. As illustrated in the drawing, this is accomplished by equipping the shaft of each piston with a gear and arranging a gear intermediate each two gears of the pistons. By virtue of this construction, the power of the engine may be taken from any piston shaft by extending it sufficiently for equipment with a pulley or other power transmitting element.

Having briefly outlined my improvement, I will proceed to describe the same in detail, reference being made to the accompanying drawing in which is illustrated an embodiment thereof.

In this drawing:

Fig. 2 is a side elevation of one unit of the engine looking in the direction of the arrows 2—2, Fig. 1.

Fig. 4 is an end elevation partly in section illustrating the chamber sealing mechanism shown in detail.

Fig. 5 is a section taken on the line 5—5, Fig. 4 viewed in the direction of the arrows.

Fig. 6 is a side elevation of one of the elliptical pistons shown in detail.

Fig. 7 is a section taken on the line 7—7, Fig. 6.

The same reference characters indicate the same parts in all the views.

Figure 1:
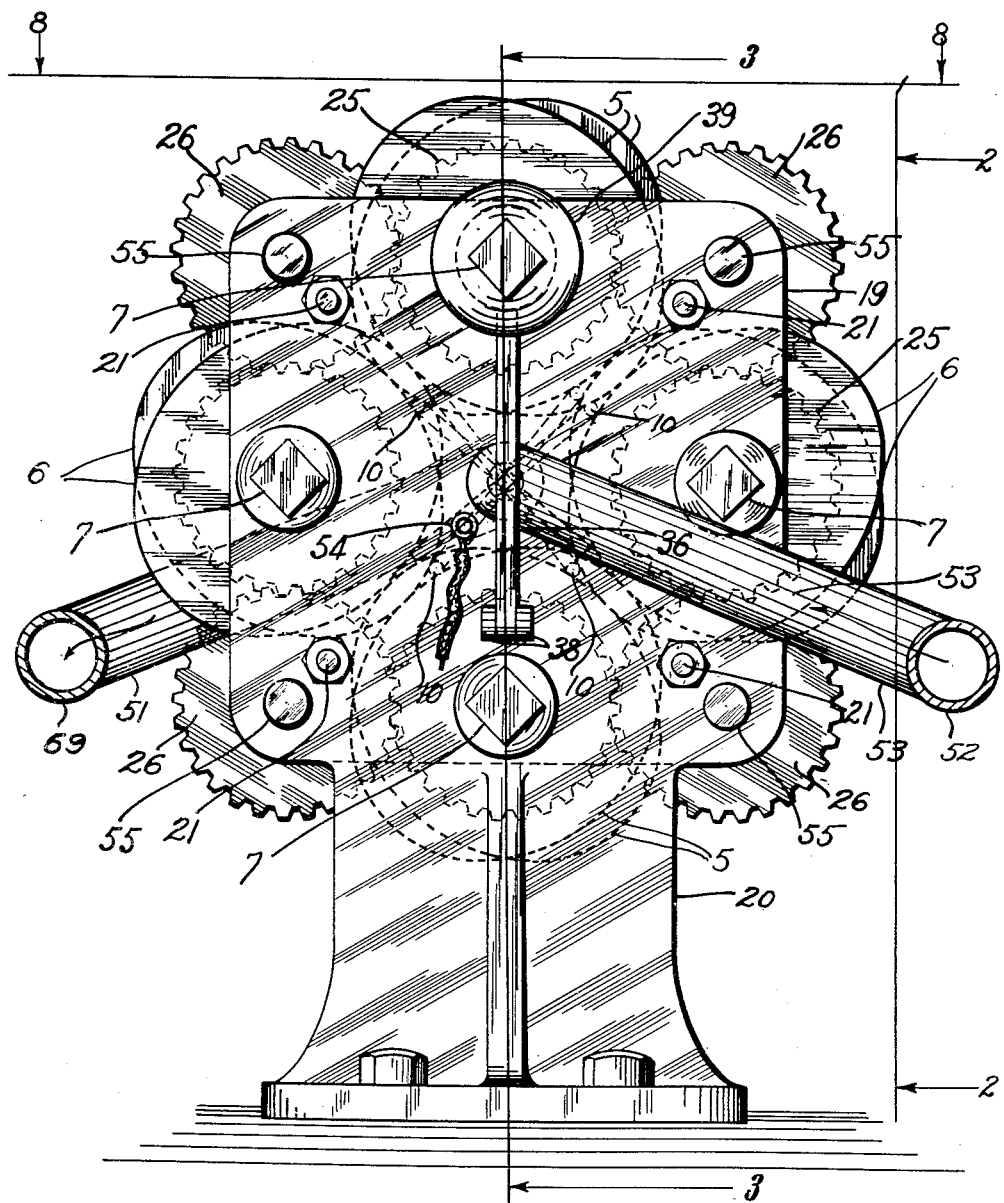
Figure 1 is an end elevation of my improved rotary engine.

In the drawing I have shown the engine unit composed of four elliptical pistons, though it must be understood that any other number that will inclose a chamber for inlet, exhaust, explosion and compression purposes may be employed. Hence, three is the minimum number of pistons that can be used. Having shown four pistons I will, for convenience, designate the two pistons whose axes may be connected by a vertical line, by the numeral 5 and the two pistons so arranged that their axes may be connected by a horizontal line, by the numeral 6. These pistons are supported on shafts 7, which, as shown in the drawing, are preferably polygonal in cross section, the square form being illustrated. These shafts are journaled in side walls which in conjunction with the four pistons of each unit inclose a chamber 8 which is sealed at the corners or narrow spaces 9 between the pistons by spring-actuated rollers 10, each of which is mounted between the spaced extremities 12 of two rods 13 which are provided with enlarged inner extremities 14 which are fitted into sleeves 15 mounted and radiating from a hub 16, the latter being centrally arranged in the chamber. Each part 14 is acted on by a spiral spring 17, one extremity of which engages the inner cross extremity of the tube while the other extremity acts on the part 14 to give the necessary range of movement, due to the variation in the volume of the chamber 9. This sealing mechanism constitutes what may be termed a floating device, since it is supported in its functional position by virtue of the pistons which coöperate with side walls 18 and 19 to form the chamber, as heretofore explained.

Figure 3:
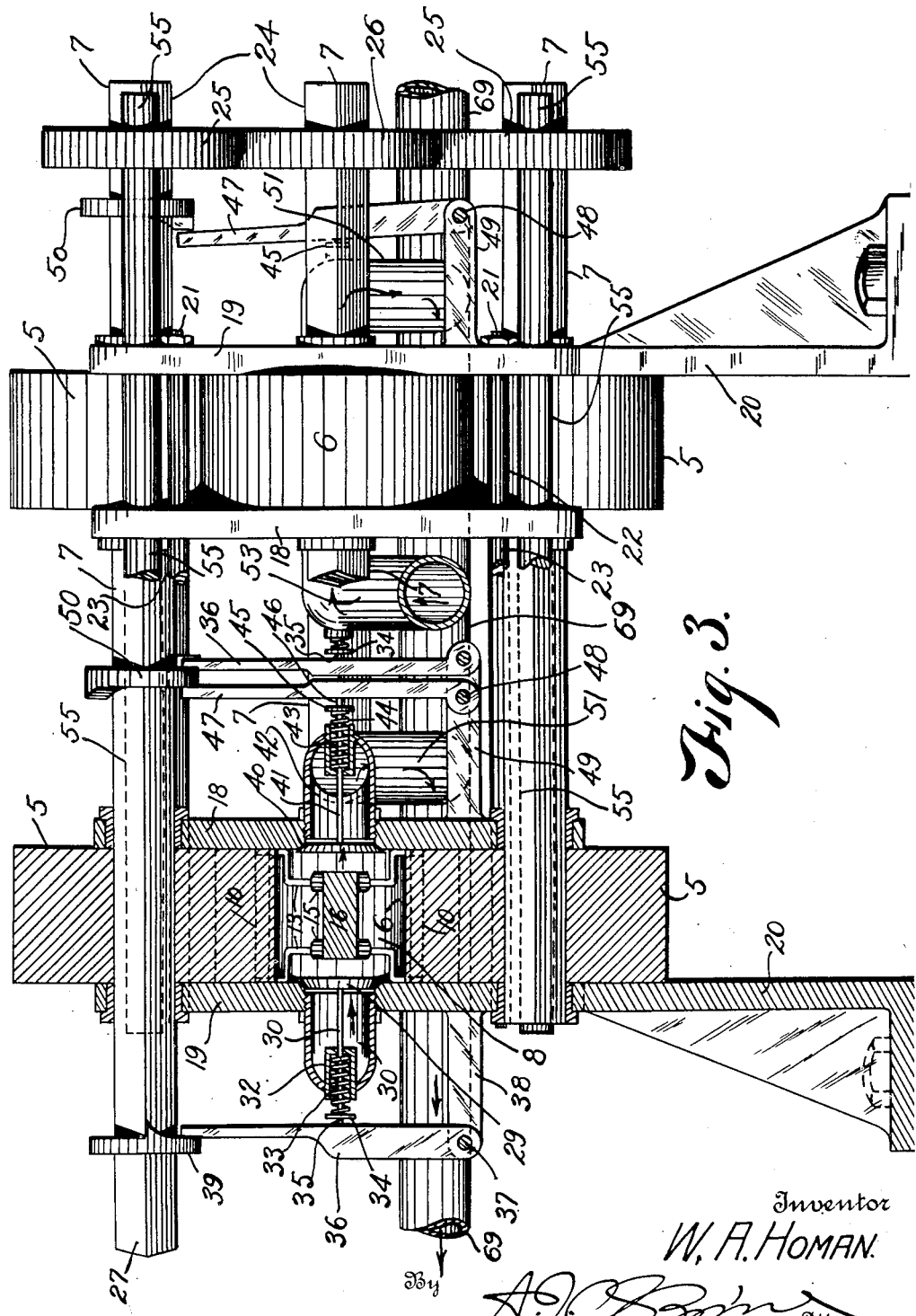
Fig. 3 is an elevation partly in section, the plane of the section being indicated by the lines 3—3, Figs. 1 and 8.

By referring to Fig. 3 of the drawing, it will be seen that the engine, as illustrated, consists of two units or two sets of pistons and coöperating side plates, but it must be understood that any desired number of units may be employed, all arranged in coöperative relation, but as the increase in the number of units is duplication only, I have not thought it necessary to illustrate more than two for the purposes of this specification. Assuming that the engine has two units, the two outermost side plates 19 are continued downwardly to form supporting members 20 for the engine. Ordinarily, two of these supporting devices will be sufficient for an engine composed of any number of units which it may be desired to use, though it is evident that the supporting members 20 may be located intermediate the extremities of the engine structure, should the number of units require greater support than the two members 20 would afford. The plates 18 are connected with the plates 19 by means of long bolts or rods 21, which are passed through spacing sleeves 22, and 23, the sleeve 22 being arranged between the side plates of each unit while the sleeves 23 are arranged between adjacent plates 18. It will be understood, however, that any suitable means may be employed for connecting and properly spacing the side plates of the unit in order that these plates may properly coöperate with the elliptical pistons for forming the chambers 8 of the units.

As illustrated in the drawing, each shaft 7 upon which the corresponding pistons of the several units are located, is extended at one extremity of the engine, as shown at 24, and upon this extension is mounted and made fast a gear 25. Hence, where each unit includes four pistons, there will be four gears 25, and these gears are connected by four interposed gears 26, whereby all the pistons of each unit and the corresponding pistons of the several units will coöperate to produce a unitary or cumulative result for power transmission purposes. As illustrated in the drawing, the uppermost shaft 7 is extended at the opposite end of the engine, as shown at 27, and on it is mounted a pulley 28, which may be utilized for transmitting power to any machine which it is desired to operate by my improved engine. Of course, any suitable power transmitting element may be connected with this shaft, or with any other shaft of the series which coöperate through the medium of the gears 25 and 26, as heretofore explained.

Figure 8:
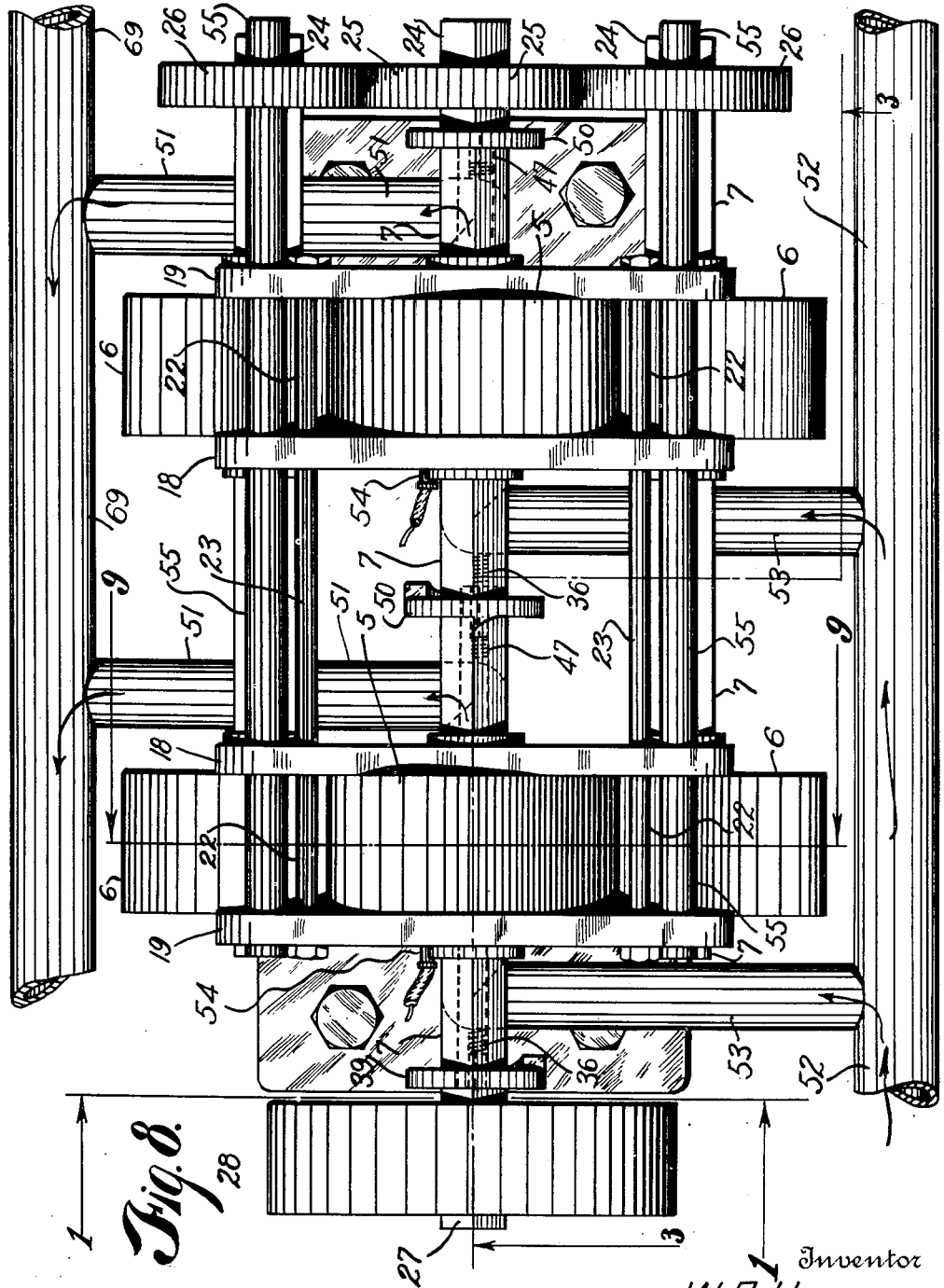
Fig. 8 is a top plan view of the engine illustrating two units thereof, being a view looking in the direction of the arrows 8, Fig. 1.

Provision is made for introducing explosive mixture to the chamber 8 of each unit through the medium of an inwardly opening valve 29 having a stem 30 passing through a chamber 31 and through an auxiliary casing 32 in which is located a spiral spring 33, one extremity of which engages the bottom of the casing 32, while the other extremity engages a stop 34 fast on the stem 30 beyond the casing, the stem 30 extending beyond the stop as shown at 35 into engagement with a lever 36 which is pivoted, as shown at 37, upon a support 38 mounted upon one of the side plates of the engine. This lever is acted on by a cam collar 39 to open the valve 29 at predetermined intervals for the introduction of a charge of explosive mixtures. On the opposite side of each chamber 8 is arranged an inwardly opening exhaust valve 40 mounted on a stem 41 which passes through a chamber 42 and through an auxiliary casing 43, the stem being surrounded within the last-named casing by a spiral spring 44, one extremity of which engages the bottom of said casing, while the opposite extremity engages a stop 45 fast on the stem, the latter extending beyond the stop, as shown at 46, into engagement with a lever arm 47 pivoted, as shown at 48, upon a support 49 extending from the side plate opposite that where the support 38 is located. A cam collar 50 mounted on the uppermost shaft 7, or on the same shaft as the cam collar 39, serves to actuate the lever arm 47 at properly timed intervals to open the valve 40 for exhaust purposes, the exhaust passing from the valve chamber 42 through a branch pipe or conduit 51 into a main exhaust conduit 69. The explosive mixture is supplied to each chamber 8 of the several units from a main conduit 52 and a branch conduit 53, the inner extremity of the latter communicating with the chamber 30. As illustrated in the drawing, the same collar 50 which operates the exhaust valve 40 also serves to operate the intake valve 29 of the adjacent unit through the medium of a lever arm 36 which acts on the stem of the intake valve 29 in the same manner as heretofore described when speaking of the intake mechanism of another unit. Hence, as the intake and exhaust valve mechanism is substantially the same for each unit, the description heretofore given which covers substantially this mechanism for a single unit will be sufficient for all the units. As shown in the drawing and referring to Fig. 3, the intake valves are all actuated by lever arms 36 which move toward the right for this purpose, while all the exhaust valves 40 are actuated for opening purposes by lever arms 47 which move toward the left for said purpose. The cam collars which actuate the exhaust valves through the medium of the lever arms 47 are designated 50 in all cases, though in this view one of these cam collars serves to actuate the lever arm 36 for opening an intake valve. It should be explained that each unit is equipped with a spark plug 54 which is positioned to produce the necessary spark for exploding the compressed charge of explosive mixture in the chamber 8 at properly timed intervals, any suitable ignition timing mechanism being employed to accomplish this purpose. As the ignition mechanism is no part of the invention claimed in this application, it has not been thought necessary to illustrate or describe this mechanism more in detail, the spark plugs being simply indicated in the drawing, being best illustrated in Figs. 1 and 8.

Figure 9:
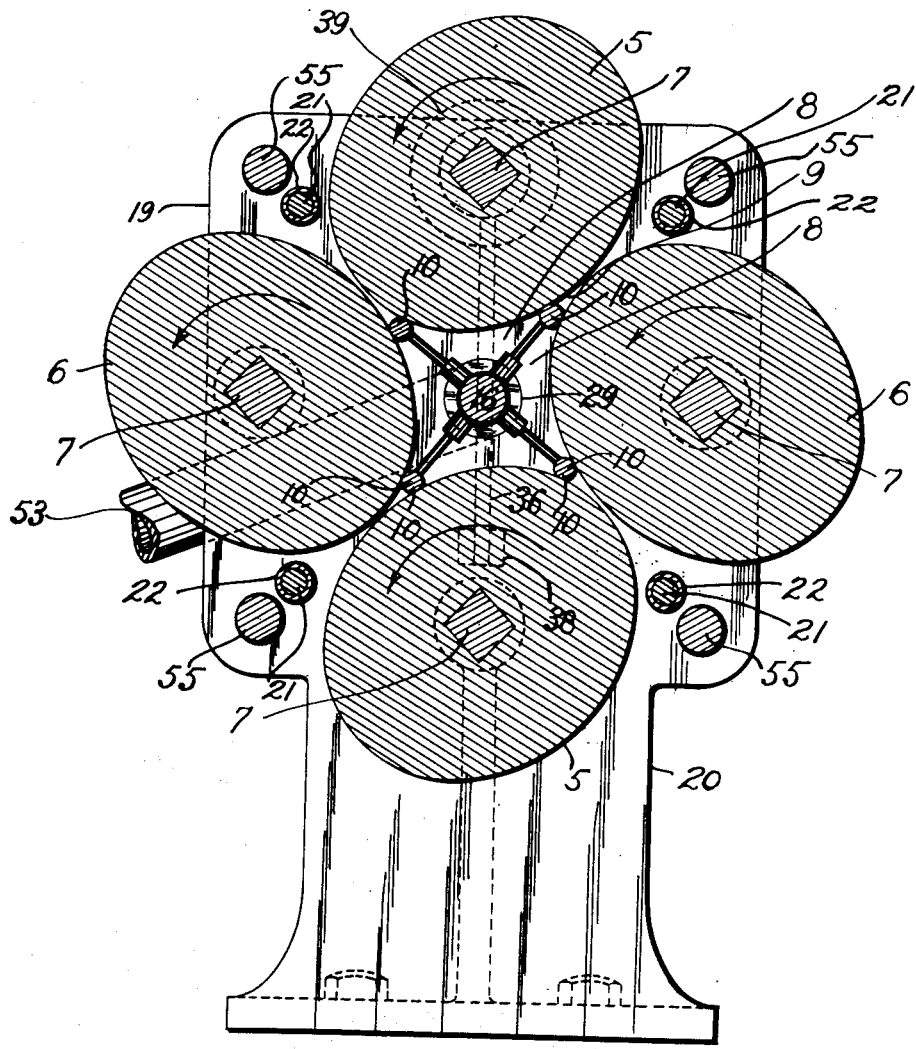
Figs. 9, 10, 11 and 12 are sectional views of a single unit of the engine, the plane of the section being indicated by the line 9—9, Fig. 2.
Figure 10:
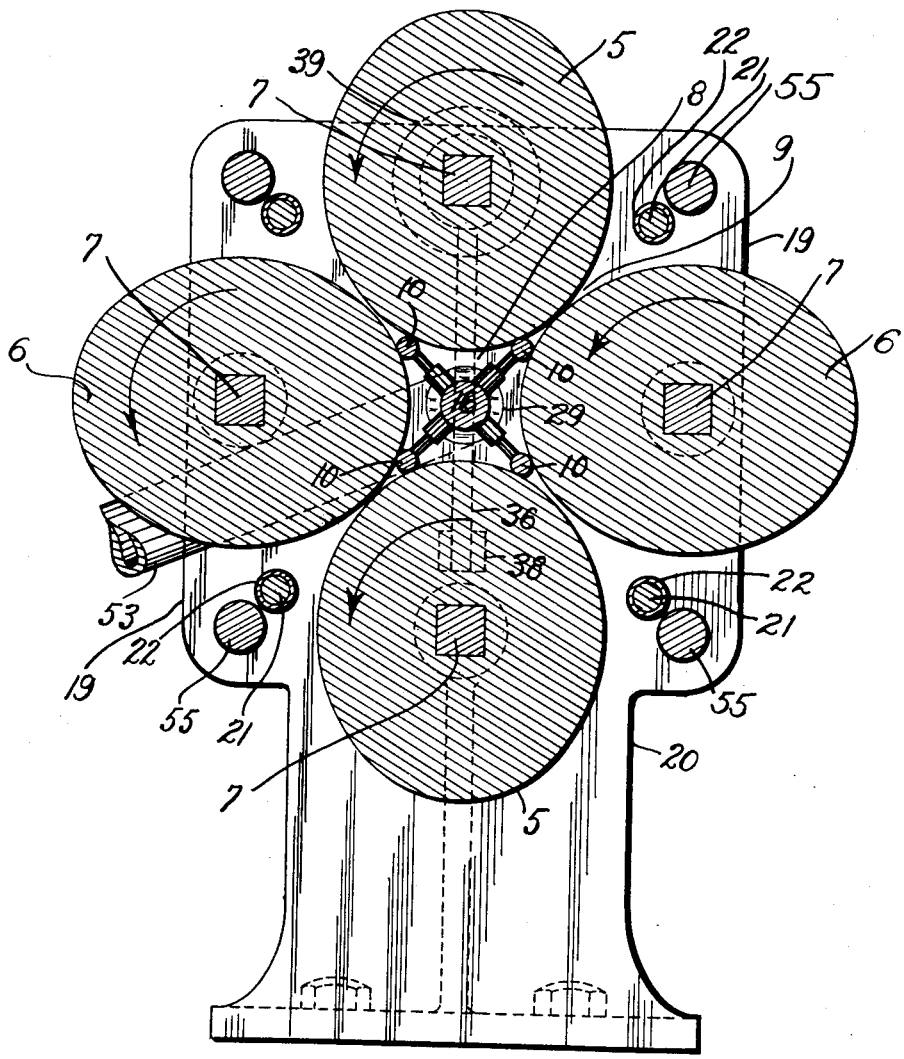
Figure 11:
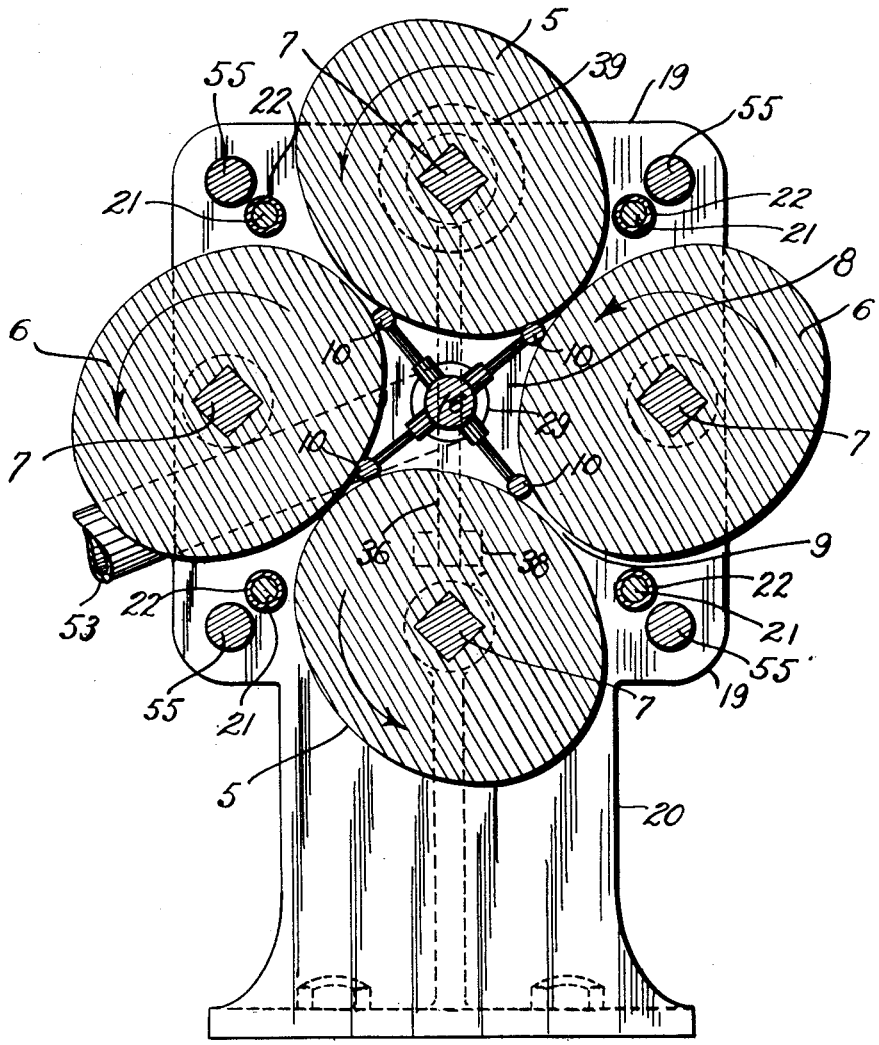
Figure 12:
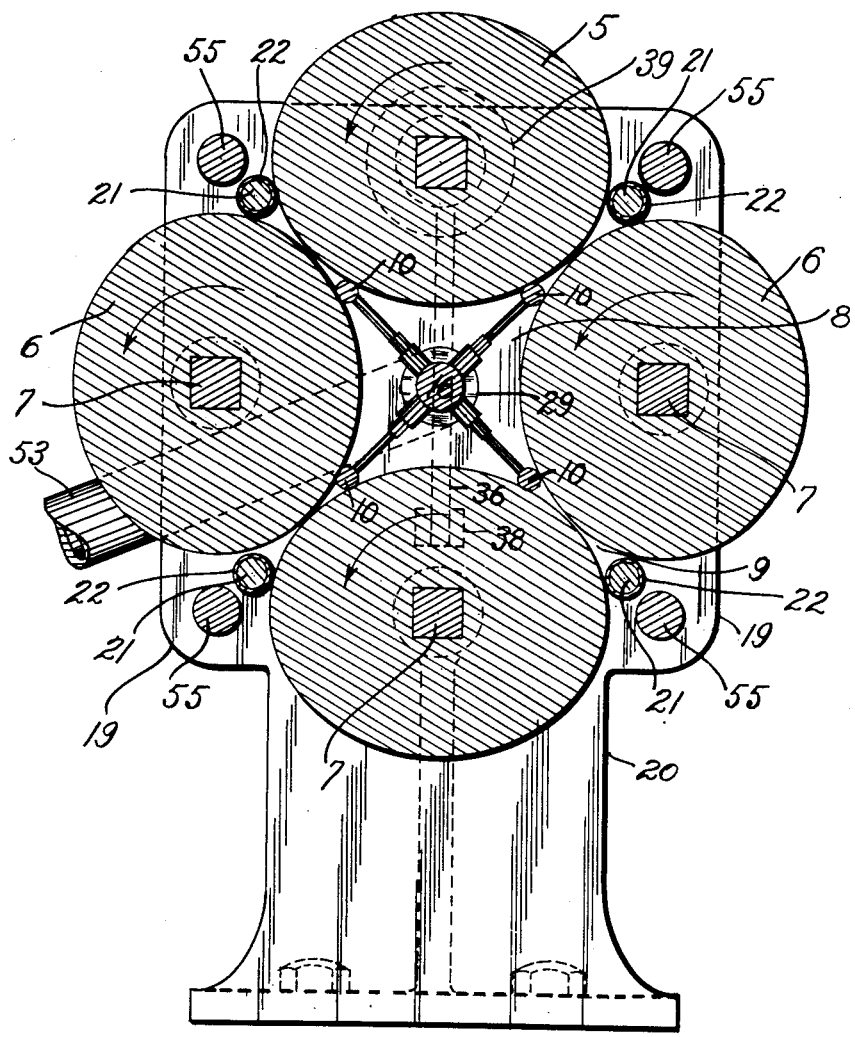

From the foregoing description the use and operation of my improved rotary engine will, it is believed, be readily understood. Assuming that the charge of explosive mixture has gone into the chamber 8 of the unit illustrated in Figs. 9 to 12 inclusive of the drawing, and has been compressed as shown in Fig. 10, the ignition mechanism is so timed as to produce the explosion when the pistons 5 and 6 are in positions slightly in advance of the dead center position in the direction in which it is desired that the pistons should travel, it being understood that these pistons may be made to rotate in either direction by the proper adjustment of the ignition mechanism, whereby the explosion in any unit is caused to occur at the proper instant or when the pistons are slightly in advance of the dead center position in either direction. Assuming now that the pistons, referring to Fig. 10, are slightly in advance of their dead center positions in the direction of their rotation indicated by the arrows in this view, and the explosion occurs, the pistons will be driven, by virtue of this explosion, in the direction indicated by the arrows, and when they have traveled one-eighth of a revolution in such direction they will be in the respective positions illustrated in Fig. 11 and the chamber 8 will be expanded approximately in the proportion illustrated. The explosive force, however, continues to act upon the pistons in the direction of the arrows for power producing purposes and the pistons after another eighth of a revolution will have reached the positions shown in Fig. 12 when the chamber will have its maximum volume, since the minor axes of the four elliptical pistons, when produced beyond their inner extremities will intersect at the center of the chamber. The mechanism is then in position for exhaust and the exhaust valve 40 of the unit which has been properly timed for the purpose is opened and while the pistons are making another eighth of a revolution, the exhaust or scavenging of the chamber will be going on and the pistons will then have reached the position indicated in Fig. 9, and when another eighth of a revolution has been traversed by each piston, the pistons will again be in the position illustrated in Fig. 10 and the exhaust will be complete. The exhaust valve will then close and the intake valve 29 will open and as the pistons continue their movement in the same direction they will, after another eighth of a revolution, again reach the position shown in Fig. 11, and after still another eighth of a revolution, they will again be in the position shown in Fig. 12, when the complete charge of the explosive mixture will be in the chamber and the intake valve will close. Compression of the charge now commences and when the pistons have reached another eighth of a revolution they will again be in the position shown in Fig. 9, and when they have made still another eighth of a revolution they will again be in the position shown in Fig. 10 when the charge of explosive mixture will be compressed and ready for another explosion, after which the cycle of operation just described, will be repeated.

It will be understood that when this engine is in use any desired number of units may be employed and it is assumed that more than one unit will always be used, whereby it becomes practicable to have the explosions in the chambers of the several units occurring at different times, the periods of explosion being so regulated that the units will best coöperate for power producing purposes. This arrangement is well known in internal combustion engines, and no special mechanism need be illustrated or explained for its accomplishment.

Attention is called to the fact that the gears 26 are mounted on shafts 55, all of which are journaled in the side plates 18 and 19 of the structure.

From the description heretofore given, it will be understood that when the chamber is at its greatest volume, the extremities of the minor axes of the several pistons are adjacent the chamber and nearest its center; while when the chamber is smallest or at its minimum volume the extremities of the major axes of the pistons are adjacent the chamber and nearest its center. Hence, when the pistons are passing between these extreme positions, the volume of the chamber is continually varying and it is by virtue of this fact that the charge of explosive mixture is drawn thereinto and compressed and the chamber finally scavenged of the refuse products of combustion.

I claim:—

1. An internal combustion rotary engine including a stationary frame, a number of elliptical pistons mounted to rotate and coöperating with the frame to form a chamber whose volume varies as the pistons change position for intake, compression and exhaust purposes, the chamber having inlet and exhaust ports, and means for opening and closing said ports at properly timed intervals.

2. An internal combustion rotary engine comprising a stationary casing, elliptical pistons mounted to rotate and coöperating with the casing to form a chamber whose volume varies as the pistons change position, means coöperating with the pistons to seal the chamber, means for introducing explosive mixture to the chamber, means for regulating the exhaust, and means for igniting the explosive mixture.

3. In an internal combustion engine, adapted for compression of an explosive fluid, the combination of a casing, a number of elliptical pistons mounted to rotate and so arranged as to form a chamber in coöperation with the casing, the pistons also being so arranged that the inner extremities of their major axes all make their nearest approach to the center of the chamber simultaneously, at which times the said axes extremities are all equidistant from said chamber center, and also arranged so that their minor axes all approach nearest the center of the chamber simultaneously, at which times these minor axes extremities are all equidistant from the said chamber center, whereby the volume of said chamber varies as the pistons change position for intake, compression and exhaust, the volume being smallest on compression and greatest at the end of the intake and explosion movements.

4. In an internal combustion engine, adapted for compression of an explosive fluid, the combination of a casing, a number of pistons of elliptical shape mounted to rotate and coöperating with the casing to form a chamber, the pistons also being so arranged that the inner extremities of their major and minor axes respectively make their nearest approach to the center of the chamber simultaneously, the opposite extremities of the respective axes of all the pistons alternately assuming said positions, whereby the volume of said chamber varies as the pistons change position for intake, compression and exhaust, the volume being smallest on compression and greatest at the end of the intake and explosion movements.

5. An internal combustion engine comprising a number of units, each unit including a casing, a number of pistons coöperating with the casing to form a chamber provided with inlet and exhaust ports, means for controlling said ports, the pistons being so arranged as to draw in a charge of explosive mixture, compress the same, utilize the explosive force for power producing and transmission purposes and scavenge the chamber of the refuse products of combustion, the corresponding pistons of the different units being arranged to perform the corresponding functions of their cycles at different times.

6. An internal combustion rotary engine including a stationary frame, a number of pistons of elliptical shape mounted to rotate and coöperating with the frame to form a chamber whose volume varies as the pistons change position for intake compression and exhaust purposes, the chamber having inlet and exhaust ports, means for opening and closing said ports at properly timed intervals, and means for connecting all the pistons to cumulate their power producing functions.

7. An internal combustion rotary engine comprising a stationary frame, a number of elliptical pistons mounted to rotate and coöperate with the frame to form a chamber whose volume varies as the pistons change position for compression and exhaust, the chamber having inlet and exhaust ports, means for opening and closing the ports at properly timed intervals, shafts upon which the pistons are respectively mounted, and means for connecting all of said shafts to cumulate their power producing functions.

8. An internal combustion engine comprising a number of units, each unit including a casing, a number of pistons coöperating with the casing to form a chamber provided with inlet and exhaust ports, means for controlling said ports, the pistons being arranged to draw in a charge of explosive mixture, compress the same, utilize the explosive force for power producing and transmission purposes and scavenge the chamber of the refuse products of combustion, the corresponding pistons of the different units being arranged to perform the functions incident to their cycles at different times, shafts upon which the correspondingly positioned pistons of all the units are mounted, and means for connecting the shafts of all the pistons to cumulate their power producing functions.

9. An internal combustion rotary engine adapted for compression of an explosive fluid including a frame, a number of pistons of elliptical shape mounted to rotate and coöperating with the frame to form a chamber whose volume varies as the pistons change position for intake, compression, explosion and exhaust, the volume being smallest on compression and greatest at the end of the intake and explosion movements, a gearing connection between the pistons to cumulate the power producing functions of the pistons.

10. An internal combustion rotary engine adapted for compression of an explosive fluid, including a frame, a number of pistons mounted to rotate and coöperating with the frame to form and inclose a chamber whose volume varies as the pistons change position for intake, compression and exhaust purposes, the volume being smallest on compression and greatest at the end of the intake and explosion movements.

11. An internal combustion rotary engine adapted for compression of an explosive fluid comprising a frame, pistons mounted to rotate and coöperate with the frame to form and inclose a chamber whose volume varies as the pistons change position for intake, compression, explosion and exhaust, the volume being smallest on compression and greatest at the end of the intake and explosion movements, and means coöperating with the pistons to seal the chamber.

In testimony whereof I affix my signature.

WALTER A. HOMAN.